United States Patent [19]
Aoshima

[11] Patent Number: 5,899,591
[45] Date of Patent: May 4, 1999

[54] FILM TRANSPORTING SYSTEM FOR CAMERA USING THREE DIFFERENT TRANSPORT SPEEDS

[75] Inventor: Chikara Aoshima, Zama, Japan

[73] Assignee: Canon Kabushiki Kaisha, Tokyo, Japan

[21] Appl. No.: 08/162,795

[22] Filed: Dec. 7, 1993

Related U.S. Application Data

[63] Continuation of application No. 07/902,865, Jun. 23, 1992, abandoned.

[30] Foreign Application Priority Data

Jun. 28, 1991 [JP] Japan ................................. 3-183942
Jun. 28, 1991 [JP] Japan ................................. 3-183943

[51] Int. Cl.$^6$ .................................................. G03B 1/18
[52] U.S. Cl. ........................................ 396/413; 396/418
[58] Field of Search ........................... 354/173.1, 173.11; 352/124; 396/387, 411, 413, 418, 439; 74/353, 354

[56] References Cited

U.S. PATENT DOCUMENTS

| | | | |
|---|---|---|---|
| 4,033,680 | 7/1977 | Pasturczak | 352/124 |
| 4,834,306 | 5/1989 | Robertson et al. | 242/71.1 |
| 4,977,419 | 12/1990 | Wash et al. | 354/76 |
| 5,136,314 | 8/1992 | Kazami et al. | 354/173.1 |
| 5,160,953 | 11/1992 | Iwashita et al. | 354/173.1 |

FOREIGN PATENT DOCUMENTS 4-86638   3/1992   Japan .

*Primary Examiner*—Safet Metjahic
*Assistant Examiner*—J. K. Han
*Attorney, Agent, or Firm*—Fitzpatrick, Cella, Harper & Scinto

[57] ABSTRACT

A film transporting system for a camera, includes a fork to engage with a film feed spool of a film cartridge, for extruding and rewinding a film, a film take-up spool, a film transporting motor, a first gear train for connecting the film transporting motor and the fork when the film transporting motor rotates in a first direction, a second gear train for connecting the film transporting motor and the fork when the film transporting motor rotates in a second direction, and a third gear train for connecting the film transporting motor and the film take-up spool when the film transporting motor rotates in the first rotational direction, wherein the first, second and third gear trains are arranged in such a manner that "V1", "V2" and "V3" have a relationship of "V1<V3<V2" in which "V1" is a rotation speed of the fork driven by the first gear train, "V2" is a rotation speed of the fork driven by the second gear train, and "V3" is a rotation speed of the fork driven by a driving force transmitted through the film from the third gear train.

10 Claims, 15 Drawing Sheets

FILM TRANSPORTING SYSTEM FOR CAMERA USING THREE DIFFERENT TRANSPORT SPEEDS

This application is a continuation of application Ser. No. 07/902,865 filed Jun. 23, 1992, now abandoned.

BACKGROUND OF THE INVENTION

1. Field of the Invention

The present invention relates to a camera, and more particularly, to an improvement in a film transporting system thereof.

2. Description of the Related Art

In a conventional film transporting system for a camera, the leading end portion of a film, also called a leader portion, extending from a film cartridge, is engaged with a film sprocket or a take-up spool, and the sprocket or the take-up spool is driven to load the film. In this type of film transporting system, a user must set the leading end portion of the film, resulting in a cumbersome operation. In addition, when the leading end portion of the film is set at a wrong position, the film is not properly loaded. A user may erroneously pull out the leading end portion of the film to expose the film, thus wasting the film.

In order to prevent these problems, a new film cartridge is disclosed in U.S. Pat. No. 4,834,306.

FIGS. 19 to 21 show this new film cartridge, in which FIG. 19 is a longitudinal sectional view thereof, FIG. 20 is a cross-sectional view thereof, and FIG. 21 is a side view showing the main part thereof.

This film cartridge comprises a film passing slit 37; a film 34 which has one end fixed to a recessed portion 38a of a film spool 38 and is wound around the film spool 38; a restraint member 39 located coaxially with the film spool 38, with a regulation portion 39a to prevent outward radial movement of an outermost surface of the film 34 and to prevent the outermost surface of the film 34 from coming into contact with an inner wall 35a of a film cartridge 35; a release member 40, arranged by partially deforming the restraint member 39, for continuously releasing the outermost surface of the film 34 from the radial regulation performed by the restraint member 39; and a guide member 41, integrally formed with the release member 40, for guiding a portion of the film 34 which is released from the restraint member 39 to the film passing slit 37. In accordance with the foregoing arrangement, the outward radial movement of the outermost surface of the film 34 caused by loosening of the film 34 upon rotation of the film spool 38 in a film extruding direction brings the outermost surface of film 34 into contact with the restraint member 39 to apply a force to the film 34 in the film extruding direction. Therefore, the film 34 can be fed out from the film cartridge 35.

When the film cartridge 35 of this type (called a thrust type) is used, after it is loaded in a camera, the film spool 38 is rotated by a fork to feed out the film 34 so that the film 34 is kept extruded out of the film cartridge. Then, the film 34 is wound around the film spool of the camera. Thus, the user need not touch the leading end portion of the film 34, which eliminates the above-described conventional drawbacks.

U.S. Pat. No. 4,977,419 discloses a camera in which a film having a magnetic memory portion is used, in which pieces of photographic information, such as a shutter speed, an aperture value, a date, and a title can be recorded on the magnetic memory portion by a magnetic head and the photographic information is read out as needed.

A camera for such a film is proposed in Japanese Patent Application No. 2-200573 which discloses the following embodiment of the camera.

The camera comprises a fork to engage with a film feed spool of a film cartridge, for extruding and rewinding a film; a film take-up spool; a film driving motor; a first gear train for connecting the film driving motor and the fork when the film driving motor rotates in a first rotational direction; a second gear train for connecting the film driving motor and the fork when the film driving motor rotates in a second rotational direction; and a third gear train for connecting the film driving motor and the film take-up spool when the film driving motor rotates in the first rotational direction, wherein the first, second and third gear trains are arranged to have a relationship of "V01=V02<V03", wherein V01 is a rotation speed of the fork driven by the first gear train, i.e., for example, at the time of extruding the film; V02 is a rotation speed of the fork driven by the second gear train, i.e., at the time of rewinding the film; and V03 is a rotation speed of the fork driven by a driving force transmitted through the film from the third gear train, i.e., at the time of winding the film and by a rotation of the film take-up spool.

FIG. 22 shows the major components of the foregoing film transporting system.

Referring to FIG. 22, reference numeral 101 denotes a film transporting motor as a driving source; 102, a pinion; 103, a first idler gear meshing with the pinion 102; 104, a dual gear having a large diameter gear portion 104a which meshes with the first idler gear 103 and a small diameter gear portion 104b which meshes with sun gears 105; 106 and 107, planetary gears which mesh with sun gear 105 and are rotatably attached to arms 108a and 108b of a first lever 108, respectively.

The first lever 108, which is rotatable around a rotation center of the first sun gear 105, the planetary gear 106, and the planetary gear 107 constitute a well-known planetary gear mechanism.

Reference numeral 109 denotes a second idler gear to mesh with either the planetary gear 106 or 107 in response to a rotational direction of the first sun gear 105. More specifically, the planetary gear 106 meshes with the second idler gear 109 when the motor 101 rotates in a forward direction, and the planetary gear 107 meshes with the second idler gear 109 when the motor 101 rotates in a reverse direction.

Reference numeral 110 denotes a third idler gear meshing with the second idler gear 109; 111, a fork gear meshing with the third idler gear 110; 112, a fork to rotate integrally with the fork gear 111, for rotating a feed spool of a film cartridge (not shown) to extrude and rewind the film.

Reference numeral 113 denotes a second sun gear meshing with the pinion 102; 114, a planetary gear meshing with the second sun gear 113; 115, a second lever for rotatably holding the planetary gear 114 while generating a frictional force with the planetary gear 114, and for causing the planetary gear 114 to revolve around the second sun gear 113 in response to a rotational direction of the second sun gear 113, in the same manner as the well-known planetary gear mechanism.

Reference numeral 116 denotes a spool gear to mesh with the planetary gear 114 only when the motor 101 rotates in the forward direction; 117, a film take-up spool fixed to the spool gear 116 and moving integrally with the spool gear 116; 118, a stopper provided on an unillustrated camera body and located at a position where the second lever 115 can abut against the stopper 118, to limit a range in which the second lever 115 can rotate.

FIG. 23 is a plan view of the gear train shown in FIG. 22 at the time of winding the film around the take-up spool 117. FIG. 24 is a plan view of the gear train shown in FIG. 22 at the time of rewinding the film into the film cartridge (not shown). In FIGS. 23 and 24, the respective gears are rotated in the directions of the arrows.

The camera, which uses the film with the magnetic memory portion, writes a shutter speed, an aperture value, the film speed, etc., to the magnetic memory portion of the film by means of the magnetic head or reads out this information as needed. A failure in reading the information from the magnetic memory portion of the film can be caused by noise, etc. In this case, the camera must again perform the action of reading the information from the same frame of the film. However, the aforementioned camera has the following problem because of the arrangement "V01=V02<V03".

In a film transporting system as shown in FIG. 23, the film is wound around the film take-up spool 117 by one frame. If reading of the information to be performed during this operation is not satisfactorily accomplished, the motor 101 is caused to rotate in the reverse direction. Such a gear train as shown in FIG. 24, is formed to rewind the film to the previous frame. Then, motor 101 is caused to rotate in the forward direction again, and reading of the information is performed again while the film is winding by one frame.

However, if when the motor 101 is changed over from the reverse direction to the forward direction, the second sun gear 113 is rotated to cause the planetary gear 114 to revolve and to mesh with the spool gear 116 before the first sun gear 105 is rotated reversely to cause the planetary gear 107 to revolve and to release meshing with the second idler gear 109. The second idler gear 109 may bite the planetary gear 107. This happens where a revolutionary extent or range of the planetary gear 114 is small.

This is because for the relationship of "V01=V02<V03", a speed of the second idler gear 109 driven through the film taken up by the rotation of the film take-up spool 117, the fork 112 rotated by the film, the fork gear 111 and the third idler gear 110, is faster than a speed at which meshing between the second idler 109 and the planetary gear 107 is released by the planetary gear 107 revolved by the rotation of the first sun gear 105 (from the state shown in FIG. 24 to the state shown in FIG. 23).

In other words, if the planetary gear 107 has not yet completely revolved when the film take-up operation is started, the planetary gear 107 is bitten or caught between the second idler gear 109 and the first sun gear 105 because the rotation speed of the first sun gear 105 (V01) is slower than the rotation speed of the second idler gear 109 (V03).

SUMMARY OF THE INVENTION

One aspect of the present invention is to provide a camera or a film transporting system for a camera, which comprises a fork to engage with a film feed spool of a film cartridge, for extruding and rewinding a film, a film take-up spool, a film transporting motor, a first gear train for connecting the film transporting motor and the fork when the film transporting motor rotates in a first rotational direction, a second gear train for connecting the film transporting motor and the fork when the film transporting motor rotates in a second rotational direction, and a third gear train for connecting the film transporting motor and the film take-up spool when the film transporting motor rotates in the first rotational direction, wherein the first, second and third gear trains are arranged in such a manner that "V1", "V2" and "V3" have a relationship of "V1<V3<V2" in which "V1" is a rotation speed of the fork driven by the first gear train, "V2" is a rotation speed of the fork driven by the second gear train, and "V3" is a rotation speed of the fork driven by a driving force transmitted through the film from the third gear train, whereby biting of gears is prevented from occurring when the film transporting motor is changed over from the second rotational direction to the first rotational direction.

Another aspect of the present invention is to provide a camera or a film transporting system for a camera, which comprises a fork to engage with a film feed spool of a film cartridge, for extruding and rewinding a film, a film take-up spool, a film transporting motor, a first gear train having a first planetary clutch mechanism comprising a first sun gear and a first planetary gear, for connecting the film transporting motor and the fork by means of the first planetary clutch mechanism when the film transporting motor rotates in a first rotational direction, and a second gear train having a second planetary clutch mechanism comprising a second sun gear and a second planetary gear, for connecting the film transporting motor and the film take-up spool by means of the second planetary clutch mechanism when the film transporting motor rotates in a second rotational direction, wherein the first and second gear trains are arranged in such a manner that "V1" and "V2" have a relationship of "V1>V2" in which "V1" is a peripheral speed of the first sun gear driven by the film transporting motor and "V2" is a peripheral speed of the second sun gear driven by the film transporting motor, whereby biting of gears is prevented when the film transporting motor is changed over from the second rotational direction to the first rotational direction.

Other aspects of the present invention will become apparent from the following description of preferred embodiments of the present invention.

DETAILED DESCRIPTION OF THE PREFERRED EMBODIMENTS

Preferred embodiments of the present invention now will be described with reference to the accompanying drawings.

FIGS. 1 through 4 show a first embodiment of the present invention.

Figure 1:
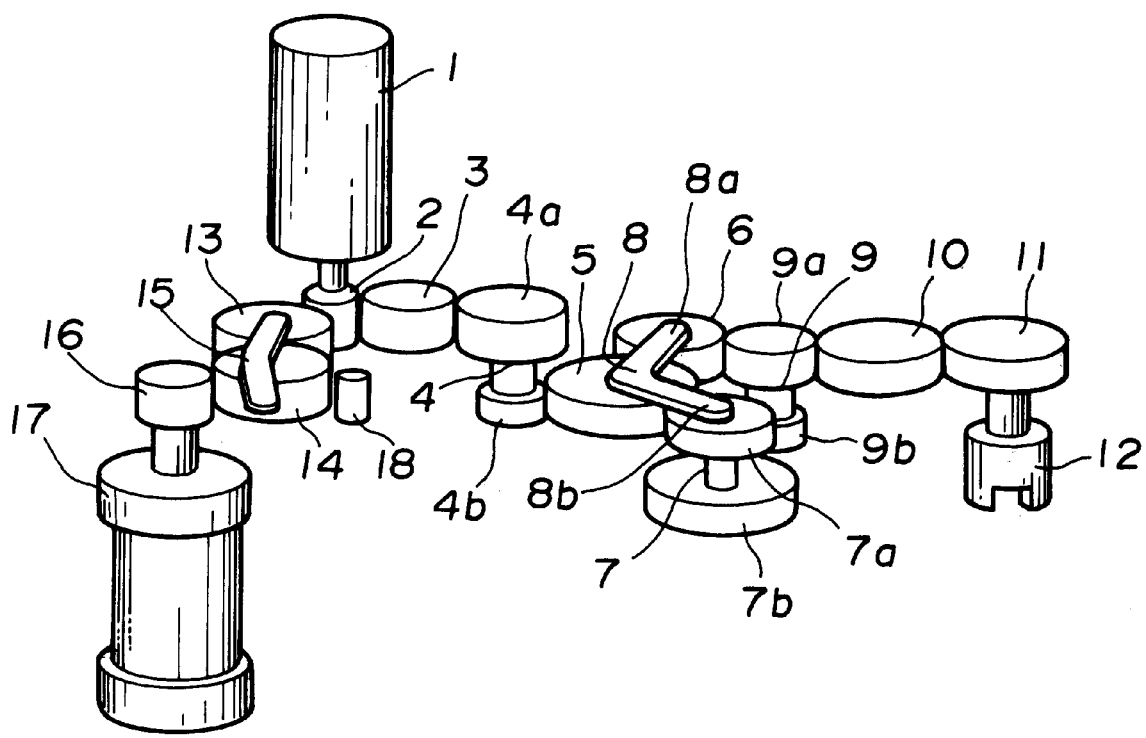
FIG. 1 is a perspective view showing a construction of a film transporting system in accordance with a first preferred embodiment of the present invention.

FIG. 1 is a perspective view of a construction of a film transporting system of a camera.

Referring to FIG. 1, reference numeral 1 denotes a film transporting motor as a driving source; 2, a pinion; 3, a first idler gear meshing with the pinion 2; 4, a dual gear having a large diameter gear portion 4a which meshes with the first idler gear 3 and a small diameter gear portion 4b which meshes with a first sun gear 5; 6 and 7, planetary gears meshing with the first sun gear 5 and rotatably attached to arms 8a and 8b of a first lever 8, respectively, provided that the planetary gear 7 meshes with the first sun gear 5 by means of a small diameter gear portion 7a of the planetary gear 7.

The first lever 8, which is rotatable around a rotation center of the first sun gear 5, the planetary gear 6, and the planetary gear 7 constitutes a well-known planetary gear mechanism.

Reference numeral 9 denotes a second idler gear wherein either a large diameter portion 9a thereof meshes with the planetary gear 6 or a small diameter portion 9b thereof meshes with a large diameter gear portion 7b of the planetary gear 7, in response to a rotational direction of the first sun gear 5. More specifically, the planetary gear 6 meshes with the large diameter gear portion 9a of the second idler gear 9 when the motor 1 rotates in a forward or wind direction, and the large diameter gear portion 7b of the planetary gear 7 meshes with the small diameter gear portion 9b of the second idler gear 9 when the motor 1 rotates in a reverse or rewind direction.

Reference numeral 10 denotes a third idler gear meshing with the large diameter gear portion 9a of the second idler gear 9; 11, a fork gear meshing with the third idler gear 10; 12, a fork to rotate integrally with the fork gear 11, for rotating a feed spool of a film cartridge (not shown) to extrude and rewind the film.

Reference numeral 13 denotes a second sun gear meshing with the pinion 2; 14, a planetary gear meshing with the second sun gear 13, 15, a second lever for rotatably holding the planetary gear 14 while generating a frictional force with the planetary gear 14, and for causing the planetary gear 14 to revolve around the second sun gear 13 in response to a rotation direction of the second sun gear 13, in the same manner as the well-known planetary gear mechanism.

Reference numeral 16 denotes a spool gear which meshes with the planetary gear 14 only when the motor 1 rotates in the forward direction; 17, a film take-up spool fixed to the spool gear 16 and moving integrally with the spool gear 16; 18, a stopper provided on an unillustrated camera body and located at a position where the second lever 15 can abut against the stopper 18, to limit a range in which the second lever 15 can rotate.

Figure 2:
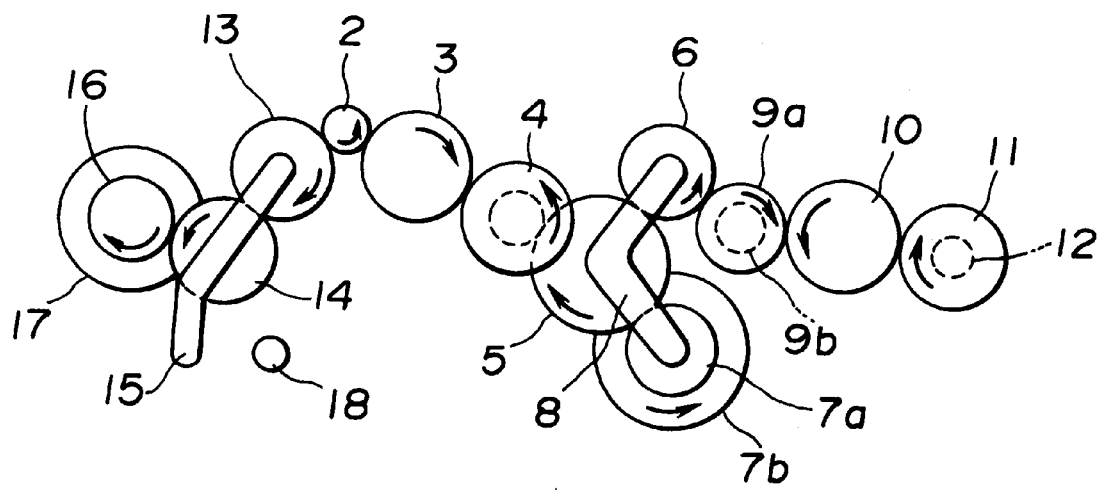
FIG. 2 is a partial plan view of the gear train shown in FIG. 1 at the time of film winding.
Figure 3:
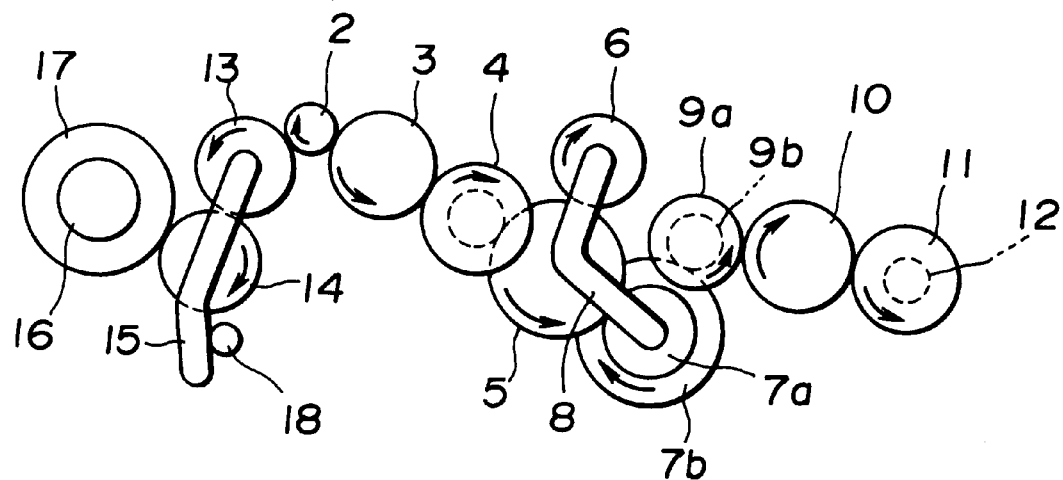
FIG. 3 is a partial plan view of the gear train shown in FIG. 1 at the time of film rewinding.

FIG. 2 is a plan view of the gear train shown in FIG. 1 at the time of winding the film around the take-up spool 17. FIG. 3 is a plan view of the gear train shown in FIG. 1 at the time of rewinding the film into the film cartridge (not shown).

In FIGS. 2 and 3, the respective gears are rotated in the direction of the arrows.

If "V1" is a rotation speed of the fork 12 driven through the pinion 2, the first idler gear 3, the dual gear 4, the first sun gear 5, the planetary gear 6, the second idler gear 9 and the third idler gear 10 when the motor 1 rotates in the forward direction in FIG. 2; "V2" is a rotation speed of the fork 12 driven through the pinion 2, the first idler gear 3, the dual gear 4, the first sun gear 5, the planetary gear 7, the second idler gear 9 and the third idler gear 10 when the motor 1 rotates in the reverse direction in FIG. 3; V3 is a rotation speed of the fork driven by a driving force transmitted through the second sun gear 13, the planetary gear 14, the spool gear 16, the film take-up spool 17 and the film (not shown) by means of the forward rotation of the motor 1 when the film is wound around the film take-up spool 17, then the number of teeth of the respective gears are arranged in such a manner that "V1", "V2" and "V3" have a relationship of "V1<V3<V2".

When a thrust type film cartridge (not shown) is loaded in the camera, the fork 12 engages with the feed spool of the film cartridge. In this state, when the driving force of the motor 1 is transmitted to the fork 12, the fork 12 is rotated to extrude a film from the film cartridge. After the film is extruded in this manner, the film is wound around the film-take-up spool 17 by a well-known means, i.e. hooking a perforation of the film on a gripper of the film take-up spool, etc.

When the film is wound around the film take-up spool in this way, because of the relationship "V1<V3", a rotation speed of the second idler gear 9, which is rotated by a driving force transmitted through the film take-up spool 17, the film (not shown), etc., becomes faster than an rotation speed of the planetary gear 6, which is rotated by a driving force transmitted through the first idler gear 3 from the motor 1. At this time, the second idler gear 9 repels the planetary gear 6 together with the first lever 8 and rotates the first lever 8 to the left, so that the second idler gear 9 unmeshes from the planetary gear 6 for an instant, whereby a speed difference therebetween is absorbed.

When the film is rewound, the motor 1 is rotated in the reverse direction to establish such a gear train as shown in FIG. 3. Accordingly, meshing between the planetary gear 15 and the spool gear 16 is released, so that the film take-up spool 17 becomes free. Meanwhile, the first sun gear 5 is rotated to the left, so that the planetary gear 7 meshes with the second idler gear 9. Thus, the fork gear 11 is rotated to the left, so that the film (not shown) is rewound into the film cartridge (not shown).

Figure 4:
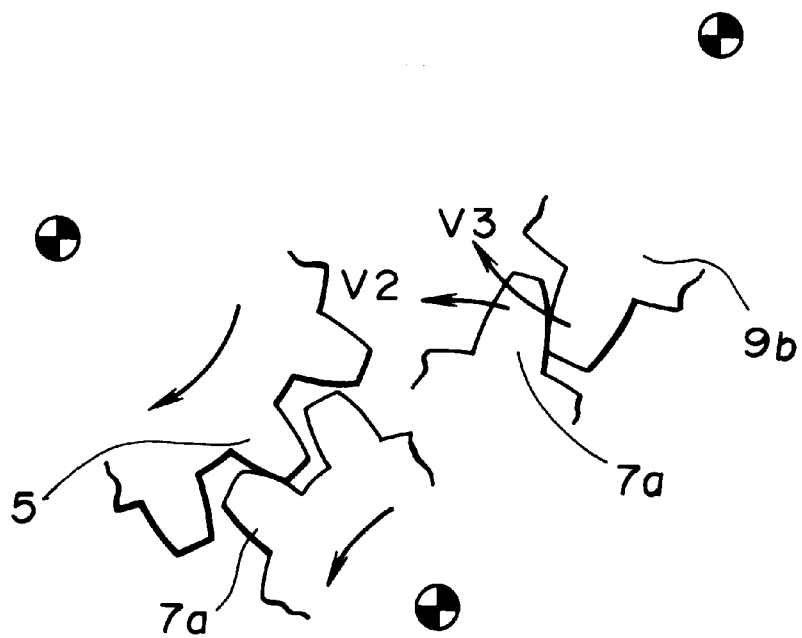
FIG. 4 is a partial plan view of a state of a gear train of FIG. 1 at the time of changing over from film rewinding to film winding.

If in the state where the film (not shown) is still wound around the film take-up spool 17, the motor 1 is rotated in the forward direction to again wind the film around the film take-up spool 17, because of the failure in reading the information as above-described, the planetary gear 7 can be revolved to the right around the first sun gear 5 by means of a driving force transmitted from the first sun gear 5 without the large diameter gear portion 7b being held down by the small diameter gear portion 9b of the second gear 9, because of the relationship of "V3<V2", as shown in FIG. 4. Therefore, the planetary gear 7 is released from the meshing state with the second idler gear 9 without biting.

After the planetary gear 7 is revolved to the right around the first sun gear 5 and released from the meshing state with the second idler gear 9, the planetary gear 7 is further revolved to the right together with the first lever 8 and the planetary gear 6. The planetary gear 6 meshes with the large diameter gear portion 9a of the second idler gear 9. At this time, the second idler gear 9 repels the planetary gear 6 together with the first lever 8 in such a manner that the planetary gear 6 is revolved to the left. As a result, the speed difference caused by "V1<V3" is absorbed.

FIGS. 5 through 9 show a second embodiment of the present invention

The present embodiment replaces the planetary gear 7 in the first embodiment with a one-way clutch.

Figure 8:
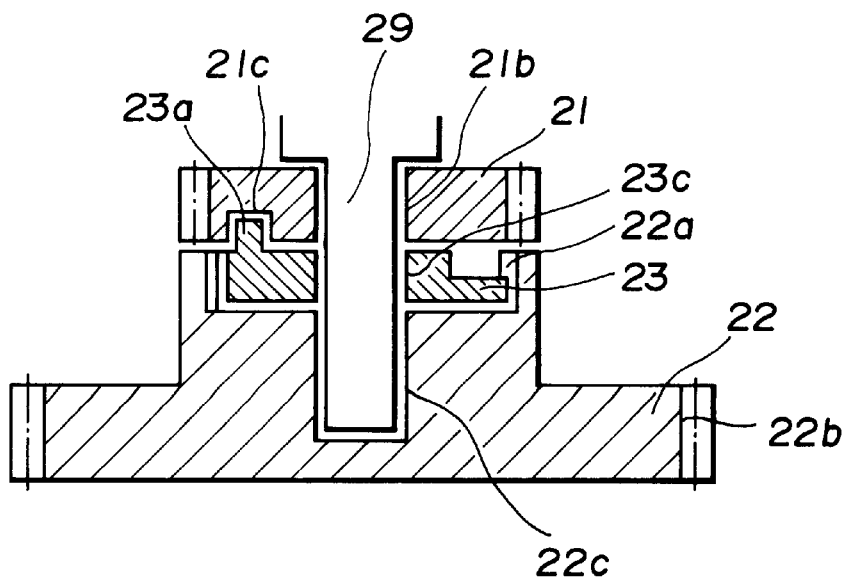
FIG. 8 is a longitudinal sectional view of a construction of a one-way clutch shown in FIG. 5.
Figure 9:
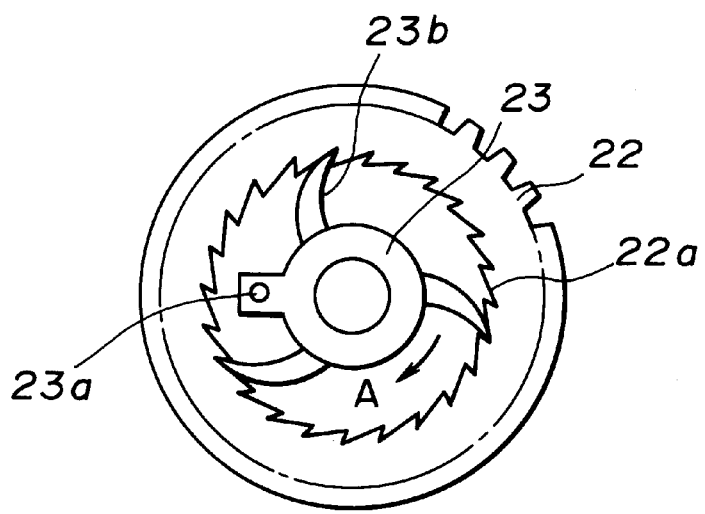
FIG. 9 is a partial plan view of the construction of the one-way clutch shown in FIG. 8.
Figure 23:
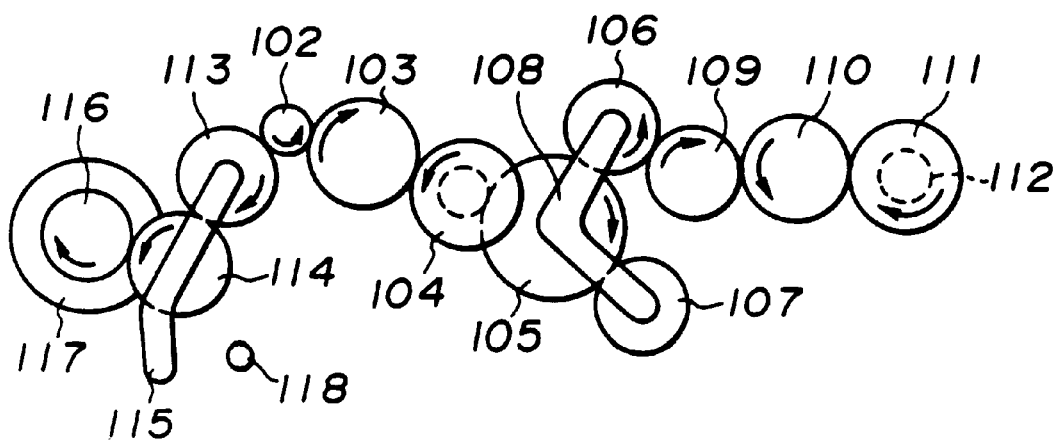
FIG. 23 is a partial plan view of the gear train shown in FIG. 22 at the time of film winding.
Figure 24:
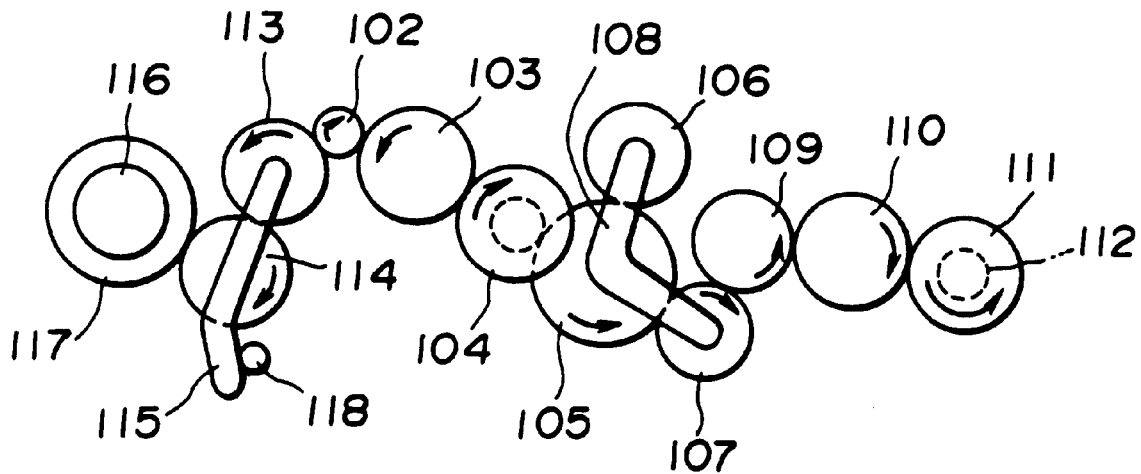
FIG. 24 is a partial plan view of the gear train shown in FIG. 22 at the time of film rewinding.
Figure 25:
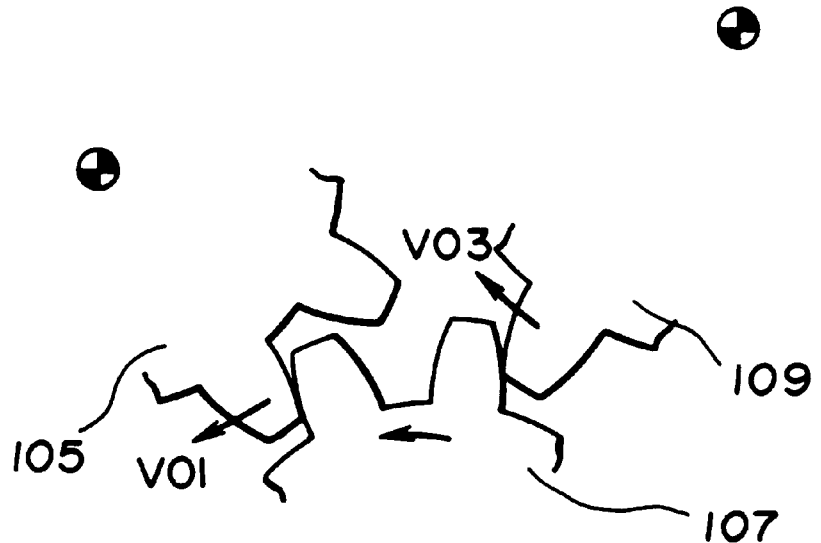
FIG. 25 is a partial plan view of a state of a gear train part of FIG. 22 at the time of changing over from film rewinding to film winding.

Reference numerals 21, 22 and 23 denote a one-way clutch, wherein 21 is a gear meshing with the first sun gear 5, 22 is a ratchet gear which has a tooth part 22a all around the inside peripheral and a large diameter gear portion 22b outside as shown in FIG. 9, and 23 is a ratchet pawl member having resilient pawl parts 23b engaging with the tooth part 22a of the ratchet gear 22 (see FIG. 9). When a relative speed of the ratchet pawl member 23 against the ratchet gear 22 takes place in the direction of the arrow A, the ratchet pawl member 23 relays a driving force to the ratchet gear 22, and when a relative speed takes place in the reverse direction to the direction of arrow A, the pawl parts 23b become bent and slide on the tooth part 22a so that the ratchet pawl member 23 does not relay the driving force to the ratchet gear 22. As shown in FIG. 8, the ratchet pawl member 23 has a pin 23a which mates with the hole 21c of the gear 21, so that the ratchet pawl member 23 always rotates in unison with the gear 21. Reference numeral 29 denotes a base board (not shown) where the gear 21, the ratchet pawl member 23 and the ratchet gear 22, and 21b, 23c and 22c of the ratchet gear 22, respectively, are mated for rotation as shown in FIG. 8.

The large diameter gear portion 22b of the ratchet gear 22 meshes with the small diameter gear portion 9b of the second idler gear 9.

Reference numeral 19 denotes a planetary lever for rotatably holding the planetary gear 6 while generating a frictional force with the planetary gear 6, and for causing the planetary gear 6 to revolve around the first sun gear 5 in response to a rotation direction of the first sun gear 5, in the same manner as the well-known planetary gear mechanism. Reference numeral 20 denotes a stopper provided on an unillustrated camera body and located at a position where the planetary lever 19 can abut against the stopper 20, thus limiting a range in which the planetary lever 19 can rotate to the left.

Figure 5:
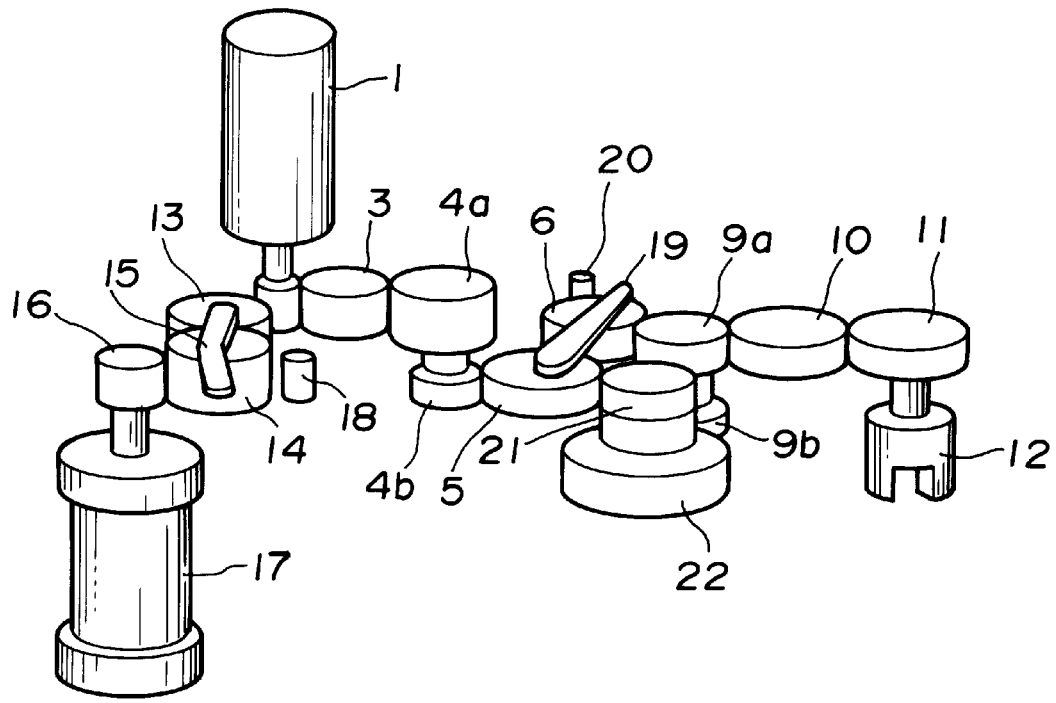
FIG. 5 is a perspective view showing a construction of a film transporting system in accordance with a second preferred embodiment of the present invention.
Figure 6:
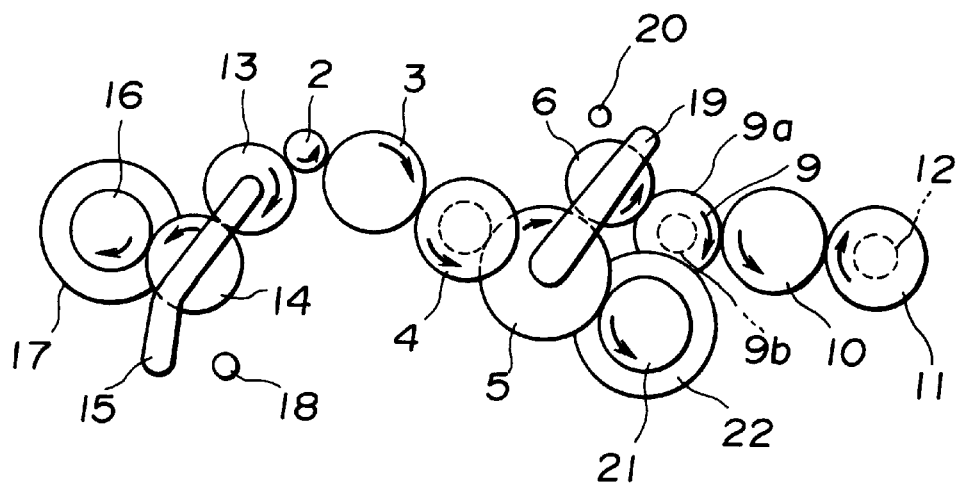
FIG. 6 is a partial plan view of the gear train shown in FIG. 5 at the time of film winding.
Figure 7:
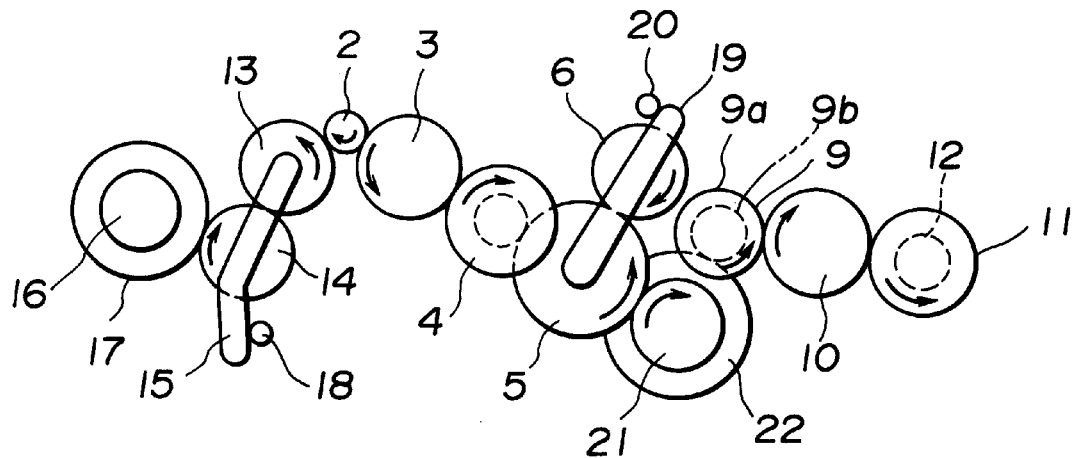
FIG. 7 is a partial plan view of the gear train shown in FIG. 5 at the time of film rewinding.

FIG. 6 is a plan view of the gear train shown in FIG. 5 at the time of winding the film around the take-up spool 17. FIG. 7 is a plan view of the gear train shown in FIG. 5 at the time of rewinding the film into the film cartridge (not shown). In FIGS. 6 and 7, the respective gears are rotated in the directions of the arrows.

If "V1" is a rotation speed of the fork 12 driven through the pinion 2, the first idler gear 3, the dual gear 4, the first sun gear 5, the planetary gear 6, the second idler gear 9 and the third idler gear 10 when the motor rotates in the forward direction in FIG. 6; "V2" is a rotation speed of the fork 12 driven through the pinion 2, the first idler gear 3, the dual gear 4, the first sun gear 5, the one-way clutch 21, 22 and 23, the second idler gear 9 and the third idler gear 10 when the motor rotates in the reverse direction in FIG. 7; "V3" is a rotation speed of the fork driven by a driving force transmitted through the second sun gear 13, the planetary gear 14, the spool gear 16, the film take-up spool 17 and the film (not shown) by means of the forward rotation of the motor 1 when the film is wound around the film take-up spool 17, then the number of teeth of the respective gears are arranged in such a manner that "V1", "V2" and "V3" have a relationship of "V1<V3<V2".

Therefore, the present embodiment achieves the same effect as the first embodiment.

Figure 10:
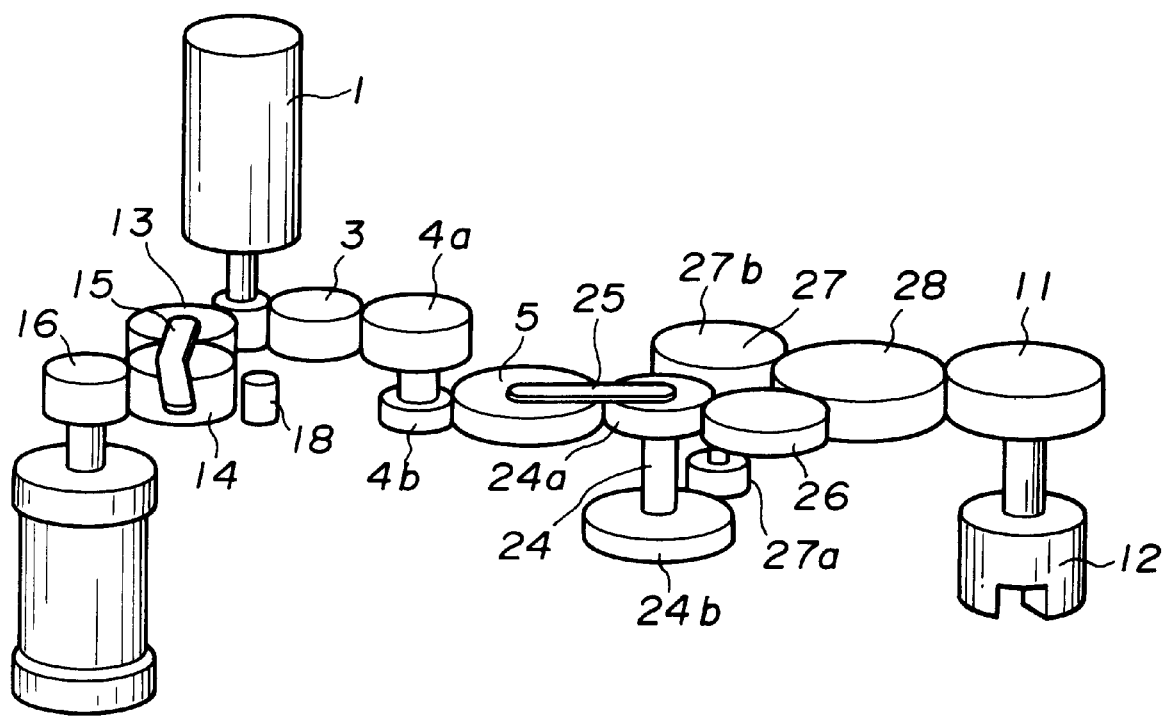
FIG. 10 is a perspective view showing a film transporting system in accordance with a third embodiment of the present invention.
Figure 11:
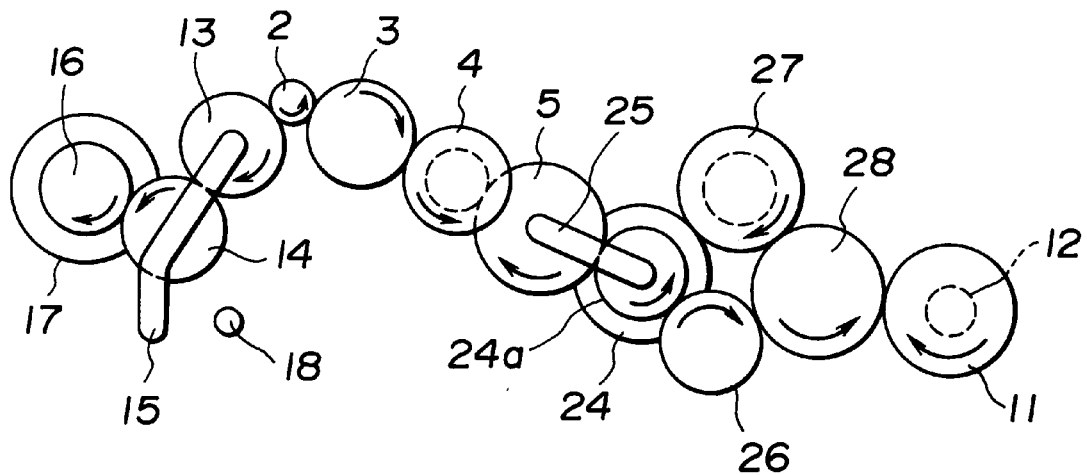
FIG. 11 is a partial plan view of the gear train shown in FIG. 10 at the time of film winding.
Figure 12:
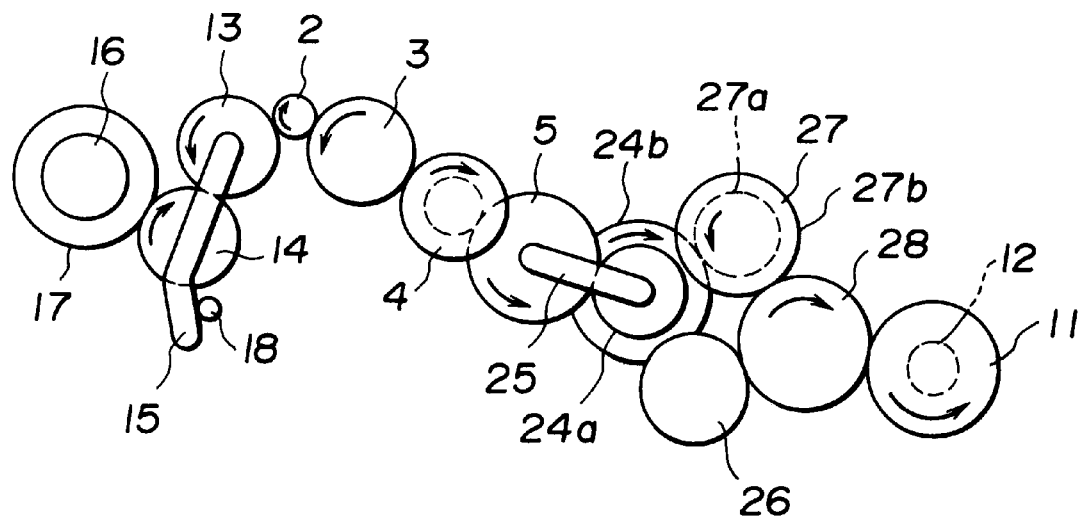
FIG. 12 is a partial plan view of the gear train shown in FIG. 10 at the time of film rewinding.

FIGS. 10, 11 and 12 show a third embodiment of the present invention.

The third embodiment shows a type of a single planetary gear for transmitting the driving force of the motor 1 directly to the fork 12.

FIG. 10 is a perspective view of a construction of a film transporting system of a camera; FIG. 11 is a partial plan view of the gear train shown in FIG. 10 at the time of winding the film around the take-up spool 17. FIG. 12 is a partial plan view of the gear train shown in FIG. 10 at the time of rewinding the film into the film cartridge (not shown).

In FIGS. 11 and 12, the respective gears are rotated in the directions of the arrows.

The first sun gear 5, a planetary gear 24 and a planetary lever 25 constitute a well-known planetary clutch mechanism. A small diameter gear portion 24a of the planetary gear 24 meshes with the sun gear 5 and can mesh with a gear 26 in response to one rotational direction of the sun gear 5. A large diameter gear portion 24b of the planetary gear 24 can mesh with a small diameter gear portion 27a of a dual gear 27 in response to the other rotational direction of the sun gear 5. A large diameter gear portion 27b of the dual gear 27 meshes with a gear 28. The gear 28 meshes with the dual gear 27, the gear 26 and fork gear 11.

Also in the present embodiment, the number of teeth of the respective gears are arranged in such a manner that the aforementioned respective rotation speeds become "V1<V3<V2", so that the present embodiment can obtain the same effect as the aforementioned respective embodiment.

According to the above respective embodiments, if "V1" is the rotation speed of the fork 12 at the time of extruding the film; "V2" is the rotation speed of the fork 12 at the time of rewinding the film; and "V3" is the rotation speed of the fork 12 through the film by means of the rotation of the film take-up spool 17, "V1", "V2" and "V3" are selected to have the relationship "V1<V3<V2". Therefore, even if because of the failure to read out the information or the like, one frame of the film is rewound into the thrust type film cartridge in the state where the film is wound around the film take-up spool 17 of the camera, and then the film is wound again around the film take-up spool 17 in order to read out the information, gear biting is prevented.

FIGS. 13 through 16 show a fourth embodiment of the present invention.

Figure 13:
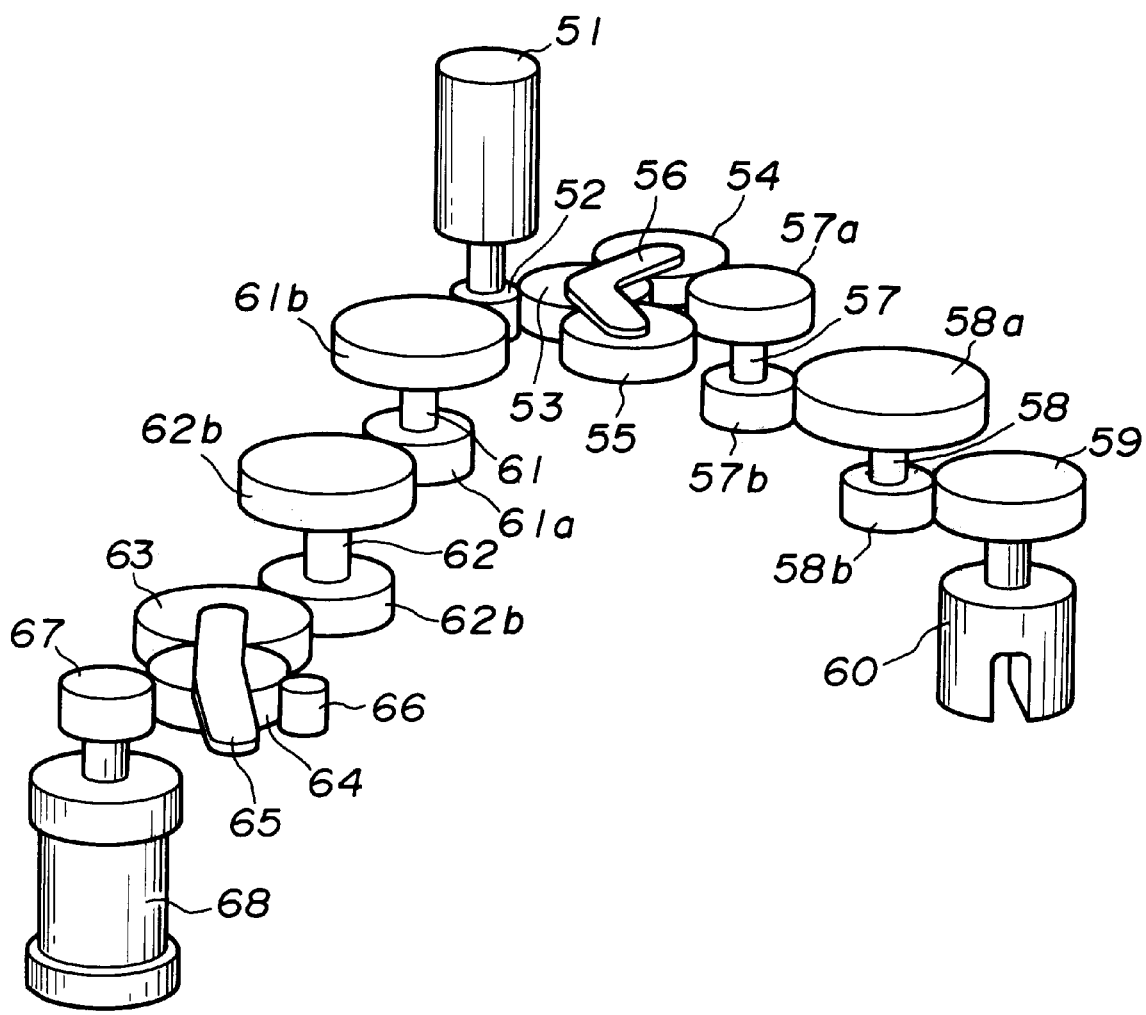
FIG. 13 is a perspective view showing a construction of a film transporting system in accordance with a fourth preferred embodiment of the present invention.

Referring to FIG. 13, reference numeral 51 denotes a film transporting motor as a driving source; 52, a pinion; 53, a first sun gear meshing with the pinion 52; 54 and 55, planetary gears meshing with the first sun gear 53; 56, a first planetary lever for rotatably holding the planetary gears 54 and 55 while generating frictional forces for rotation with the planetary gears 54 and 55, and for causing the planetary gears 54 and 55 to revolve around the first sun gear 53 and to mesh with a large diameter gear portion 57a of a first gear 57, in response to a rotational direction of the second sun gear 53, in the same manner as a well-known planetary gear mechanism.

Reference numeral 58 denotes a second gear wherein a large diameter gear portion 58a meshes with a small diameter gear portions 57b of the first gear 57; 59, a fork gear meshing with a small diameter gear portion 58b of the second gear 58; 60, a fork to rotate integrally with the fork gear 59, for rotating a feed spool of a film cartridge (not shown) to extrude and rewind the film Reference number 61 denotes a third gear wherein a large diameter gear portion 61b of the third gear 61 meshes the pinion 52; 62, a fourth gear wherein a large diameter gear portion 62a of the fourth gear 62 meshes a small diameter gear portion 61a of the third gear 61; 63, a second sun gear meshing with a small diameter gear portion 62b of the fourth gear 62; 64, a planetary gear meshing with the second sun gear 63; 65, a second planetary lever for rotatably holding the planetary gear 64 while generating a frictional force with the planetary gear 64, and for causing the planetary gear 64 to revolve around the second sun gear 63 in response to a rotational direction of the second sun gear 63, in the same manner as the well-known planetary gear mechanism.

Reference numeral 67 denotes a spool gear which meshes with the planetary gear 64 only when the motor 51 rotates in the forward direction; 68, a film take-up spool fixed to the spool gear and moving integrally with the spool gear 67; 66, a stopper provided on an unillustrated camera body and located at a position where the second lever 65 can abut against the stopper 66, to limit a range in which the second lever 65 can rotate.

Figure 14:
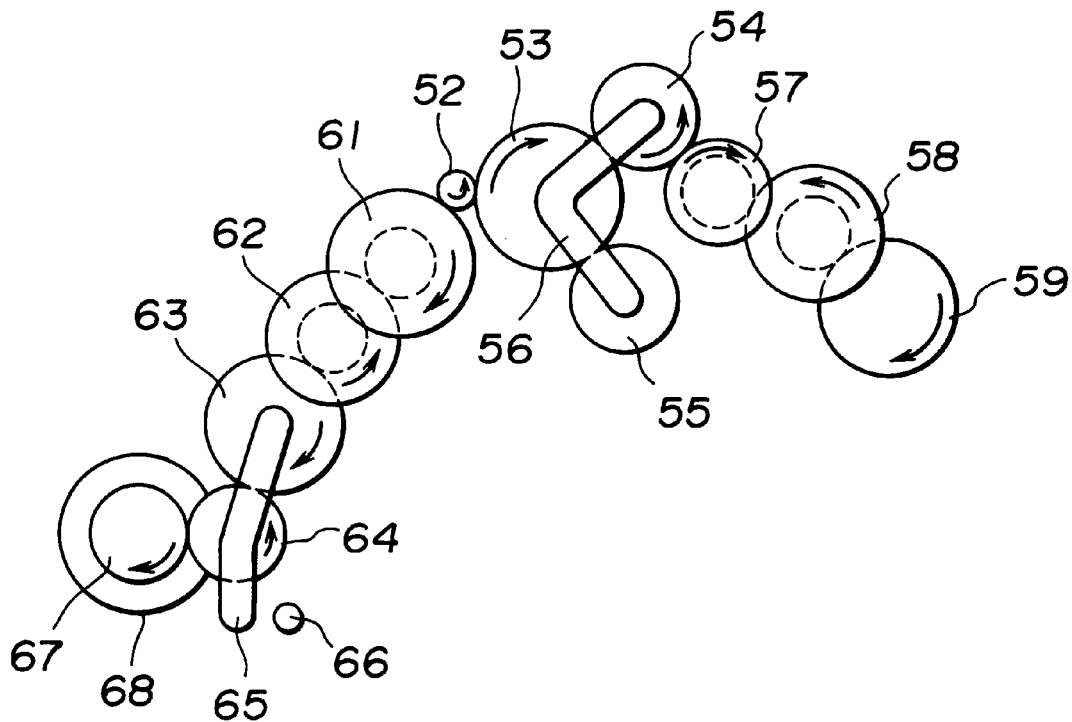
FIG. 14 is a partial plan view of the gear train shown in FIG. 13 at the time of film winding.
Figure 15:
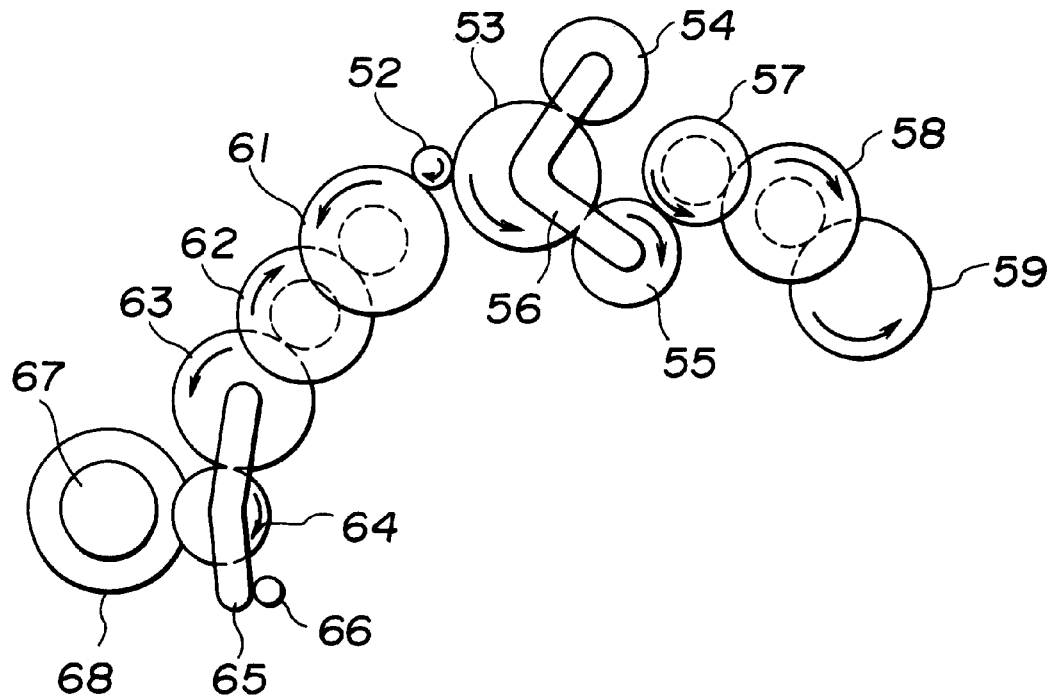
FIG. 15 is a partial plan view of the gear train shown in FIG. 13 at the time of film rewinding.

FIG. 14 is a plan view of the gear train shown in FIG. 13 at the time of winding the film around the take-up spool 67. FIG. 15 is a plan view of the gear train shown in FIG. 13 at the time of rewinding the film into the film cartridge (not shown). In FIGS. 14 and 15, the respective gears are rotated in the directions of the arrows.

If "V10" is a peripheral speed of the first sun gear 53 driven by the motor 51, "V20" is a peripheral speed of the second sun gear 63 by driving the motor 51; "V30" is a peripheral speed of the take-up spool driven by the motor 51; and "V40" is a speed of the film extruded from the film cartridge by the rotation of the fork 60, then the numbers of teeth of the respective gears are arranged in such a manner that "V10", "V20", "V30" and "V40" have relationships of "V10>V20" and "V30>V40".

According to the above-described construction, when a thrust type film cartridge is loaded in the camera, the motor 51 is driven so as to become such a gear train as shown in FIG. 14. As a result, the fork 60 is rotated to the right, so that the film is extruded from the film cartridge (not shown). After the film reaches the film take-up spool 68, the film is wound around the film take-up spool 68 by a well-known means, i.e. hooking a perforation of the film on a gripper of the film take-up spool, etc.

At this time, even if a clockwise direction speed of the first gear 57, to which a driving force is transmitted through the film take-up spool 68, the film, the fork 60 and the second gear 58, is faster than a counterclockwise direction speed of the planetary gear 54 driven by the first sun gear 53, the first gear 57 repels the planetary gear 54, so that meshing between the planetary gear 54 and the first gear 57 is released, whereby a speed difference therebetween is absorbed.

Next, an operation at the time of rewinding the film is explained.

When the motor 51 is rotated in the reverse direction, the first planetary lever 56 and the second planetary lever 65 are rotated to the left as shown in FIG. 15. Accordingly, meshing between the planetary gear 54 and the first gear 57 is released, and the planetary gear 55 meshes with the first gear 57. Meanwhile, the spool gear 67 unmeshes from the planetary gear 64, and the film is rewound into the film cartridge (not shown) by a rotation of the fork 60 through the fork gear 59.

If in the state where the film (not shown) is still wound around the film take-up spool 68, the motor 51 is changed from the above-described rewinding the film to the opposite state, i.e. rotated in the forward direction, to wind the film around the film take-up spool 68 (in order to perform this operation again because of the failure to read the information as above-described), the state of meshing between the planetary gear 55 and the first gear 57 is released by the right rotation of the first sun gear 53 before the planetary gear 64 meshes with the spool gear 67 by the right rotation of the second sun gear 63. This is because the relationship between V10 and V20 is arranged to be "V10>V20" (V10: the peripheral speed of the first sun gear 53, V20: the peripheral speed of the second sun gear 63). Therefore, the planetary gear 55 is revolved around the first sun gear 53 without being held down as shown in FIG. 15, by the first gear 57 to which the driving force is transmitted through the film from the film take-up spool 68, so that a normal film winding state is established.

Figure 16:
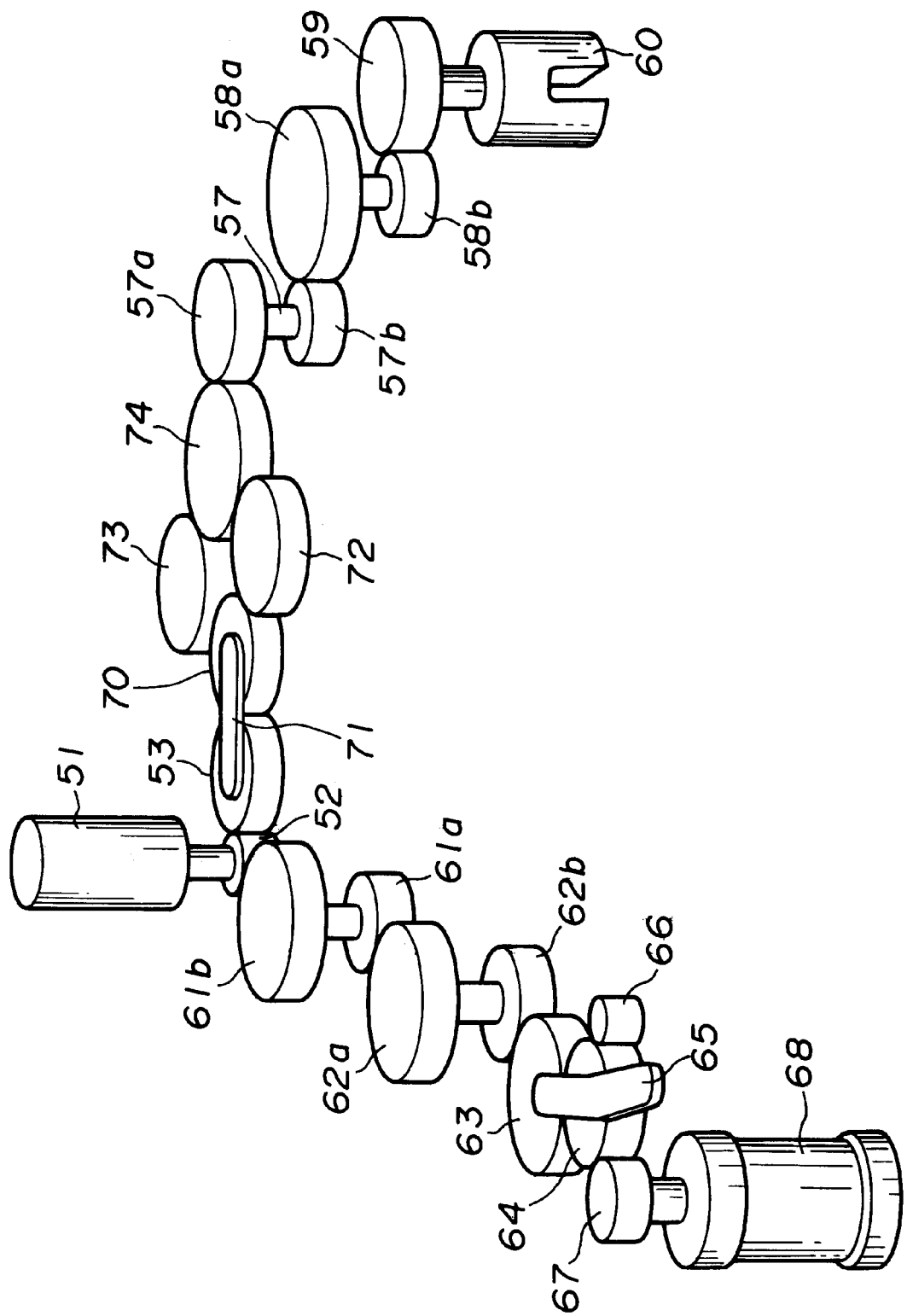
FIG. 16 is a perspective view showing a construction of a film transporting system in accordance with a fifth preferred embodiment of the present invention.
Figure 17:
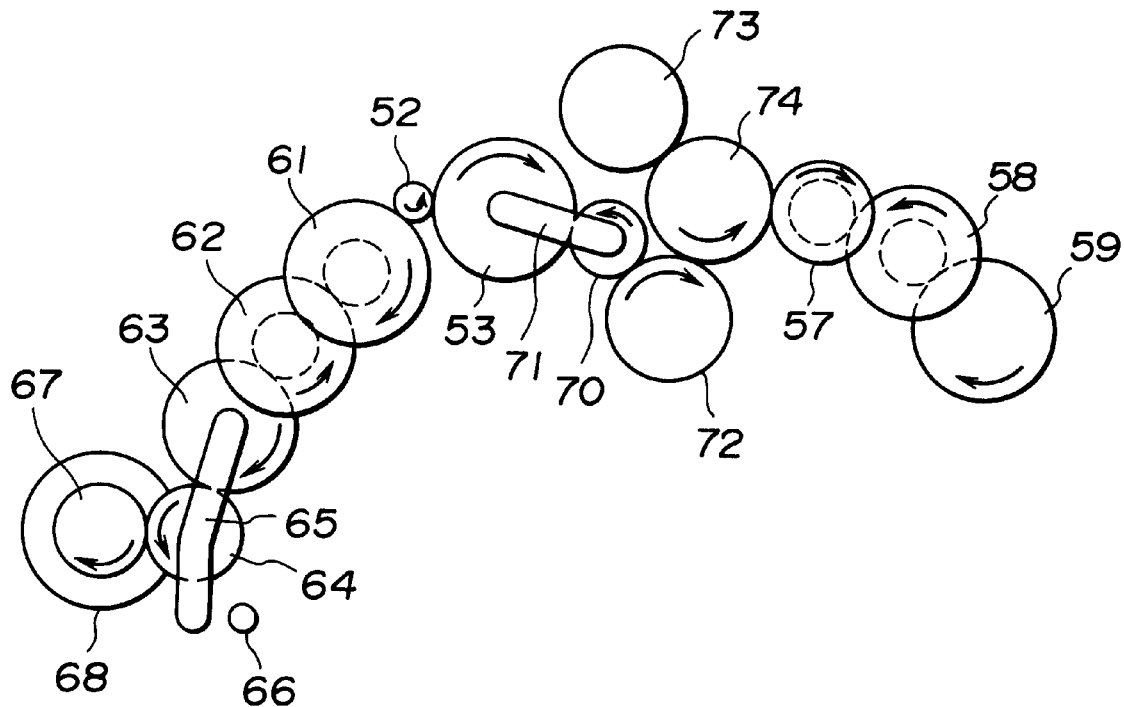
FIG. 17 is a partial plan view of the gear train shown in FIG. 16 at the time of film winding.
Figure 18:
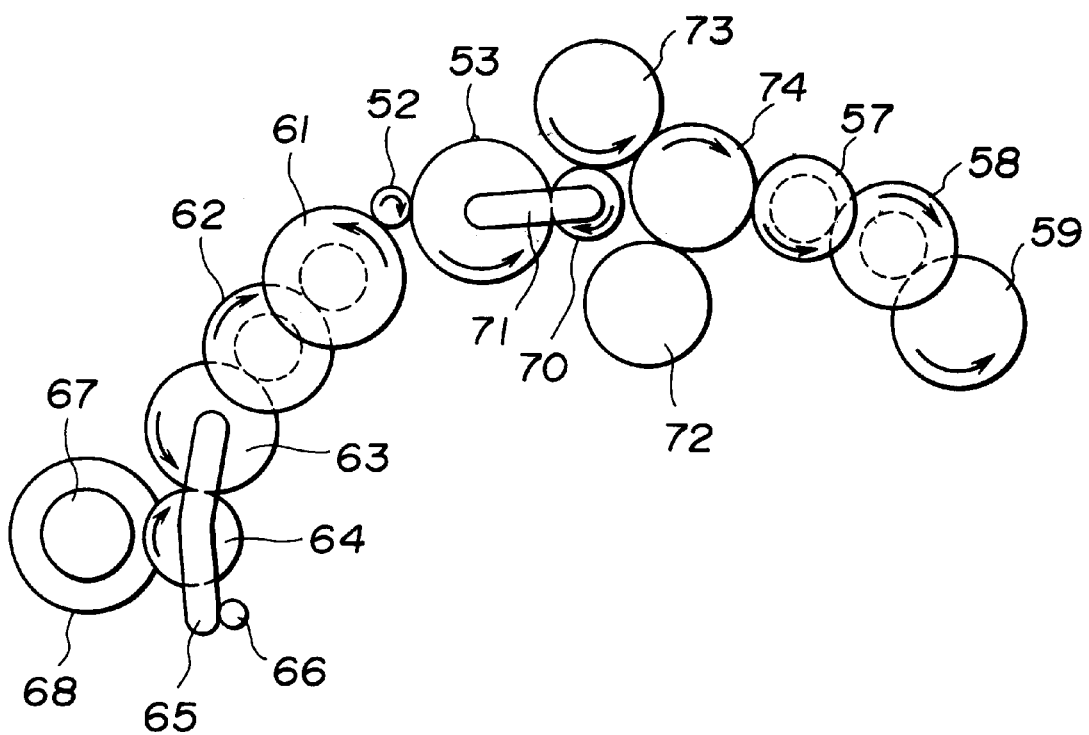
FIG. 18 is a partial plan view of the gear train shown in FIG. 16 at the time of film rewinding.
Figure 19:
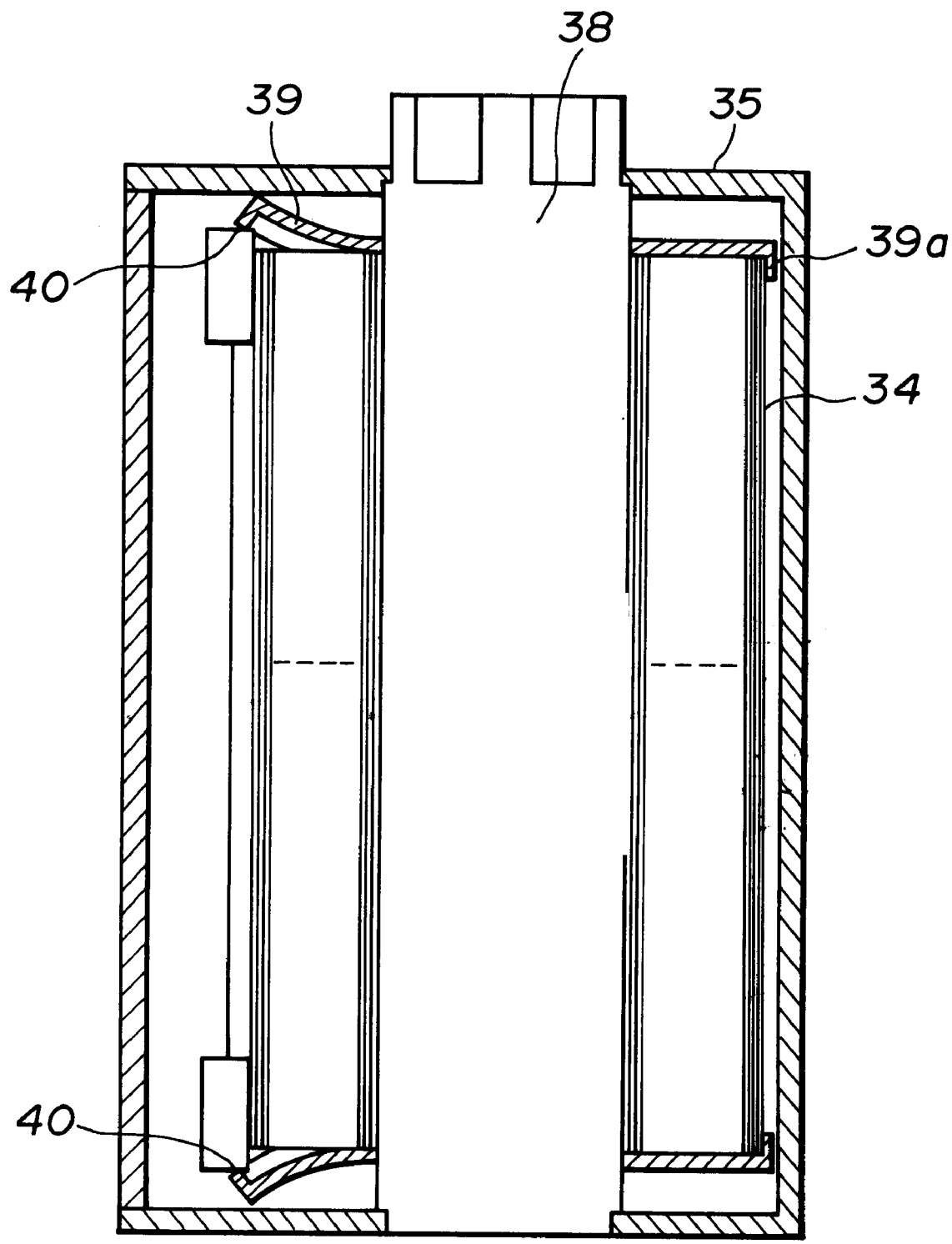
FIG. 19 is a longitudinal sectional view of a thrust type film cartridge used in the embodiment of the present invention.
Figure 20:
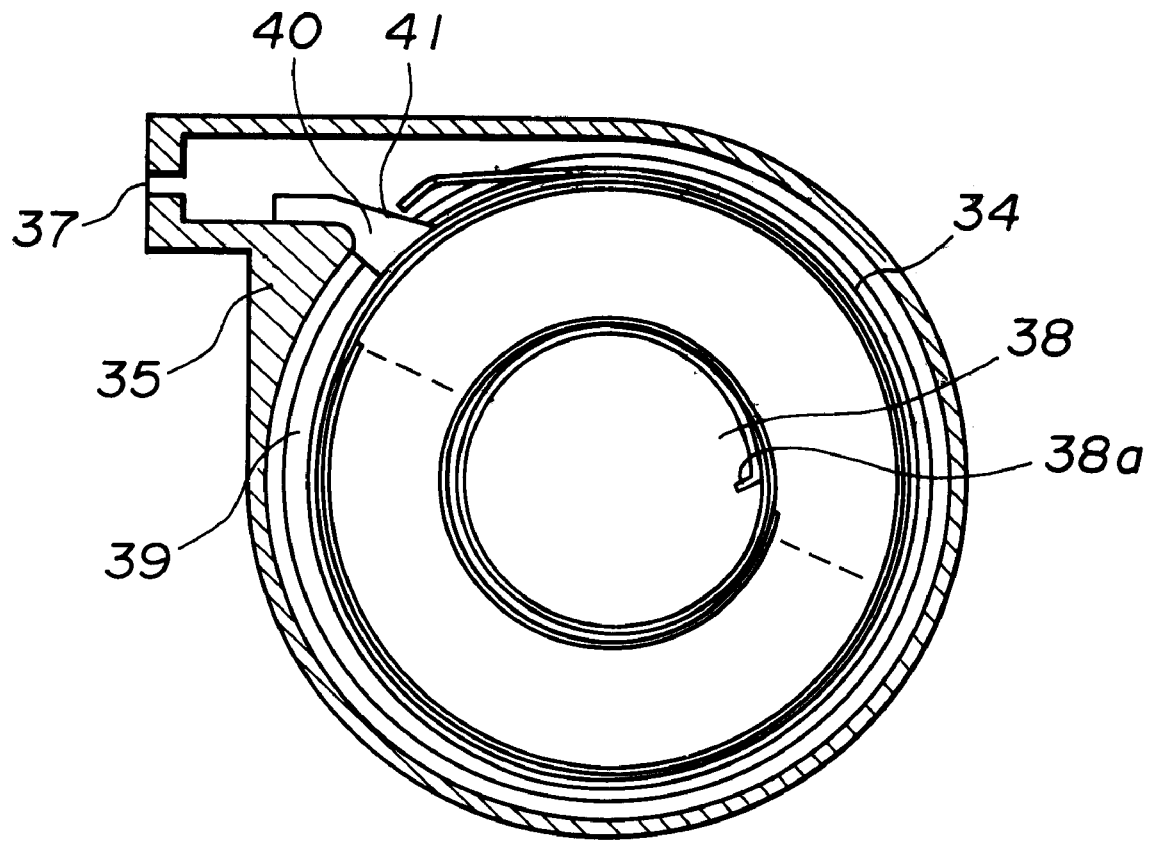
FIG. 20 is a cross-sectional view of the thrust film cartridge shown in FIG. 19.
Figure 21:
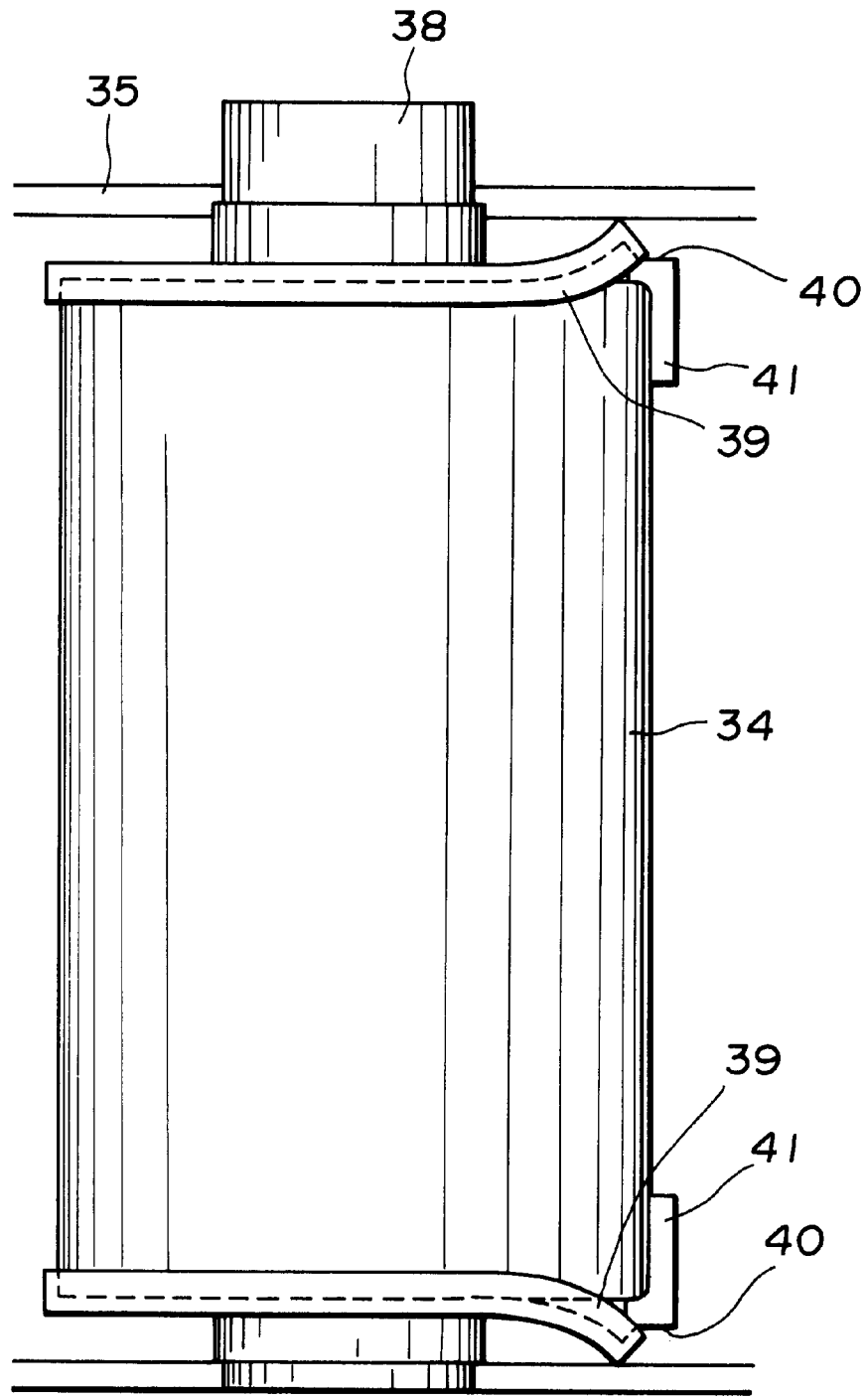
FIG. 21 is a side view of the thrust film cartridge shown in FIG. 19.
Figure 22:
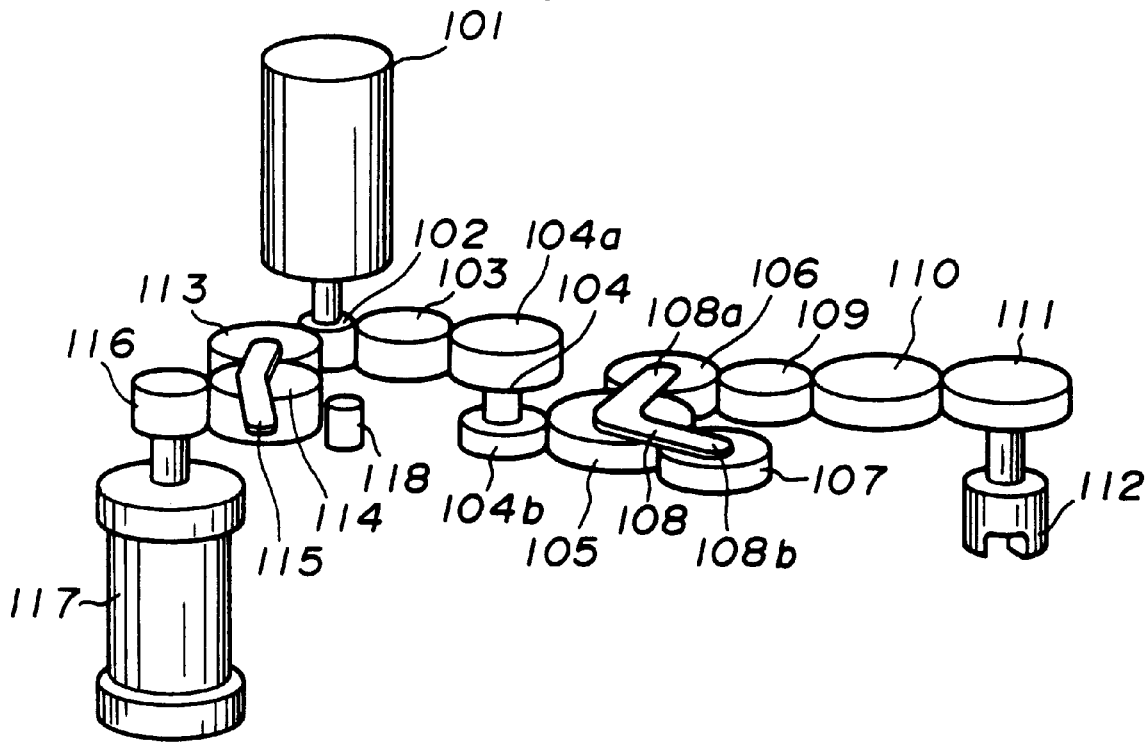
FIG. 22 is a perspective view showing a construction of a film transporting system in accordance with a related art.

FIGS. 16, 17 and 18 show a fifth embodiment of the present invention.

The present embodiment shows a type of a single planetary gear for transmitting the drive force of the motor 51 to the fork 60.

FIG. 16 is a perspective view of a construction of a film transporting system for use in a camera. FIG. 17 is a partial plan view of the gear train shown in FIG. 16 at the time of winding the film around the take-up spool 68. FIG. 18 is a plan view of the gear train shown in FIG. 16 at the time of rewinding the film into the film cartridge (not shown). In FIGS. 17 and 18, the respective gears are rotated in the directions of the arrows.

The first sun gear 53, a planetary gear 70 and a planetary lever 71 constitute a well-known planetary clutch mechanism. The planetary gear 70 meshes with the sun gear 53 and can mesh with gears 72 or 73 in response to the rotational direction of the sun gear 55. Reference numeral 74 denotes an idler gear meshing with the first gear 57 and gears 72 and 73.

Also in the present embodiment, the number of teeth of the respective gears are arranged to establish the aforementioned relationships of "V10>V20" and "V30>V40", so that the present embodiment achieves the same effect as the fourth embodiment.

According to the fourth and fifth embodiments, if "V10" is the peripheral speed of the first sun gear 53 arranged between the motor 51 and the fork 60, "V20" is the peripheral speed of the second sun gear 63 arranged between the motor 51 and the film take-up spool 68, then "V10" and "V20" are selected to have the relationship "V10>V20". Therefore, even if there is a failure to read out the information or the like, the film is rewound into the thrust type film cartridge by one frame in the state where the film is wound around the film take-up spool 68, and then the film is again wound around the film take-up spool 68 in order to read out the information, the gear biting is prevented so that a subsequent operation is not stopped.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A film transporting system for a camera, comprising:
   a fork adapted to engage with a film feed spool of a film cartridge, for extruding and rewinding a film;
   a film take-up spool;
   a film transporting motor;
   a first gear train for connecting said film transporting motor and said fork when said film transporting motor rotates in a first direction;
   a second gear train for connecting said film transporting motor and said fork when said film transporting motor rotates in a second direction;
   a third gear train for connecting said film transporting motor and said film take-up spool when said film transporting motor rotates in the first direction;
   wherein said first, second and third gear trains are arranged in such a manner that "V1", "V2" and "V3" have a relationship of "V1<V3<V2" in which "V1" is a rotation speed of said fork driven by said first gear train, "V2" is a rotation speed of said fork driven by said second gear train, and "V3" is a rotation speed of said fork driven by a driving force transmitted through the film from said third gear train.

2. A system according to claim 1, wherein at least one of said first, second and third gear trains comprises a clutch.

3. A system according to claim 2, wherein said clutch comprises a planetary clutch device.

4. A system according to claim 2, wherein said clutch comprises a one-way clutch device.

5. A film transporting system for a camera, comprising:
   a fork adapted to engage with a film feed spool of a film cartridge, for extruding and rewinding a film;
   a film take-up spool;
   a film transporting motor;
   a first gear train having a first planetary clutch mechanism comprising a first sun gear and a first planetary gear, for connecting said film transporting motor and said fork by means of said first planetary clutch mechanism when said film transporting motor rotates in a first direction;
   a second gear train having a second planetary clutch mechanism comprising a second sun gear and a second planetary gear, for connecting said film transporting motor and said film take-up spool by means of said second planetary clutch mechanism when said film transporting motor rotates in a second direction;
   wherein said first and second gear trains are arranged in such a manner that "V1" and "V2" have a relationship of "V1>V2" in which "V1" is a peripheral speed of said first sun gear driven by said film transporting motor and "V2" is a peripheral speed of said second sun gear driven by said film transporting motor.

6. A camera, comprising:
   a fork adapted to engage with a film feed spool of a film cartridge, for extruding and rewinding a film;
   a film take-up spool;
   a film transporting motor;
   a first gear train for connecting said film transporting motor and said fork when said film transporting motor rotates in a first direction;
   a second gear train for connecting said film transporting motor and said fork when said film transporting motor rotates in a second direction;
   a third gear train for connecting said film transporting motor and said film take-up spool when said film transporting motor rotates in the first direction;
   wherein said first, second and third gear trains are arranged in such a manner that "V1", "V2" and "V3" have a relationship of "V1<V3<V2" in which "V1" is a rotation speed of said fork driven by said first gear train, "V2" is a rotation speed of said fork driven by said second gear train, and "V3" is a rotation speed of said fork driven by a driving force transmitted through the film from said third gear train.

7. A camera according to claim 6, wherein at least one of said first, second and third gear trains comprises a clutch.

8. A camera according to claim 7, wherein said clutch comprises a planetary clutch device.

9. A system according to claim 7, wherein said clutch comprises a one-way clutch device.

10. A camera, comprising:
    a fork adapted to engage with a film feed spool of a film cartridge, for extruding and rewinding a film;
    a film take-up spool;
    a film transporting motor;
    a first gear train having a first planetary clutch mechanism comprising a first sun gear and a first planetary gear, for connecting said film transporting motor and said fork by means of said first planetary clutch mechanism when said film transporting motor rotates in a first direction;
    a second gear train having a second planetary clutch mechanism comprising a second sun gear and a second planetary gear, for connecting said film transporting motor and said film take-up spool by means of said second planetary clutch mechanism when said film transporting motor rotates in a second direction;

wherein said first and second gear trains are arranged in such a manner that "V1" and "V2" have a relationship of "V1>V2" in which "V1" is a peripheral speed of said first sun gear driven by said film transporting motor and "V2" is a peripheral speed of said second sun gear driven by said film transporting motor.

* * * * *